United States Patent
Maertens

(10) Patent No.: US 10,704,442 B2
(45) Date of Patent: Jul. 7, 2020

(54) METHOD FOR OPTIMIZING THE CONSUMPTION OF REDUCING AGENT IN A MOTOR VEHICLE EXHAUST LINE

(71) Applicants: Continental Automotive France, Toulouse (FR); Continental Automotive GmbH, Hannover (DE)

(72) Inventor: Steven Maertens, Toulouse (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 2 days.

(21) Appl. No.: 16/082,443

(22) PCT Filed: Mar. 3, 2017

(86) PCT No.: PCT/FR2017/050477
§ 371 (c)(1),
(2) Date: Sep. 5, 2018

(87) PCT Pub. No.: WO2017/153665
PCT Pub. Date: Sep. 14, 2017

(65) Prior Publication Data
US 2019/0390586 A1 Dec. 26, 2019

(30) Foreign Application Priority Data
Mar. 9, 2016 (FR) .................................. 16 51949

(51) Int. Cl.
*F01N 3/10* (2006.01)
*F01N 3/20* (2006.01)
(Continued)

(52) U.S. Cl.
CPC ............ *F01N 3/106* (2013.01); *F01N 3/208* (2013.01); *F01N 11/002* (2013.01);
(Continued)

(58) Field of Classification Search
CPC ...... F01N 3/106; F01N 3/208; F01N 13/0093; F01N 11/002; F01N 2250/02; F01N 2260/02; F01N 2900/1616
See application file for complete search history.

(56) References Cited

U.S. PATENT DOCUMENTS

2007/0227143 A1* 10/2007 Robel .................. F01N 3/2073
60/605.1
2011/0011060 A1 1/2011 McCarthy
(Continued)

FOREIGN PATENT DOCUMENTS

| JP | 2013144938 A | | 7/2013 |
|---|---|---|---|
| JP | 2014025398 A | | 2/2014 |
| JP | 2015086848 A | * | 5/2015 |

OTHER PUBLICATIONS

International Search Report and Written Opinion for International Application No. PCT/FR2017/050477, dated May 30, 2017—8 pages.

*Primary Examiner* — Brandon D Lee
(74) *Attorney, Agent, or Firm* — RatnerPrestia

(57) ABSTRACT

A process for optimizing the consumption of reducing agent in the form of ammonia in an exhaust line including first and second selective catalytic reduction systems, the second system being arranged downstream of the first system, being spaced apart by a spacing, a surplus of unused ammonia passing via the exhaust line, the temperature in the exhaust line at the second system being measured or estimated. When the temperature at the second system exceeds a first maximum value, or when a calculated rate of temperature rise is greater than a predetermined rate of rise, with the proviso that the temperature at the second system is greater than a second maximum value that is less than the first maximum value, forced cooling is carried out in the spacing between the first and second systems.

15 Claims, 2 Drawing Sheets

(51) Int. Cl.
  *F01N 13/00*  (2010.01)
  *F01N 11/00*  (2006.01)
(52) U.S. Cl.
  CPC ...... *F01N 13/0093* (2014.06); *F01N 2250/02* (2013.01); *F01N 2260/02* (2013.01); *F01N 2900/1616* (2013.01)

(56) References Cited

U.S. PATENT DOCUMENTS

| | | | |
|---|---|---|---|
| 2011/0023463 A1* | 2/2011 | Dobson | F01N 3/035 60/286 |
| 2012/0023907 A1* | 2/2012 | Brahma | F01N 3/208 60/274 |
| 2017/0130637 A1* | 5/2017 | Franz | F01N 3/208 |
| 2017/0175607 A1* | 6/2017 | De Smet | F01N 13/0093 |
| 2018/0073408 A1* | 3/2018 | Kallen | F01N 3/2066 |

\* cited by examiner

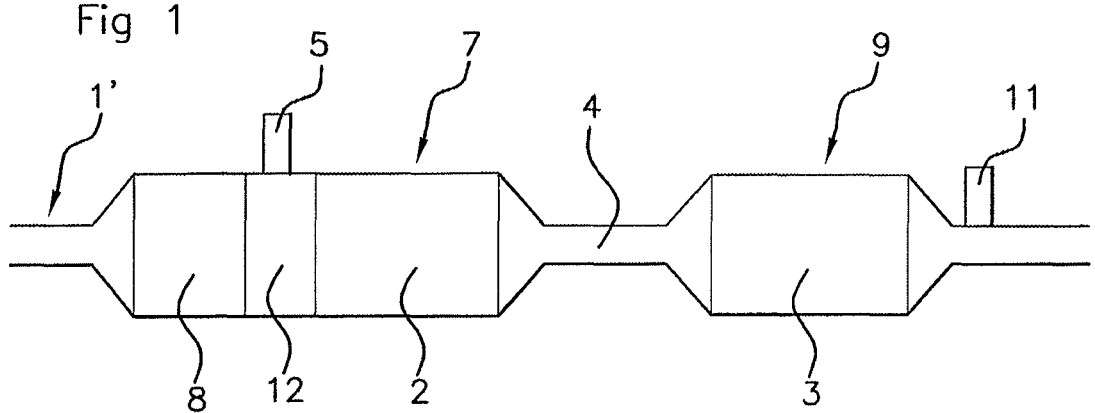
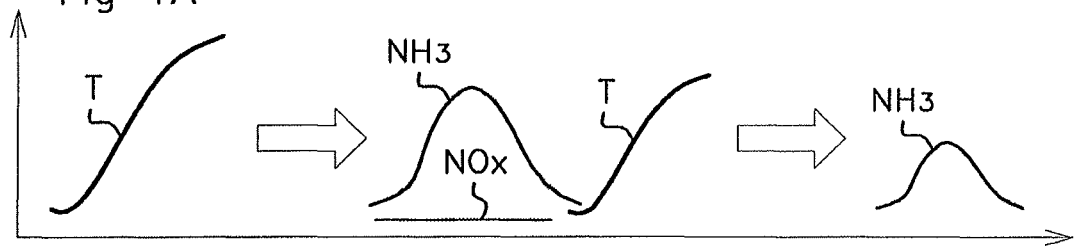
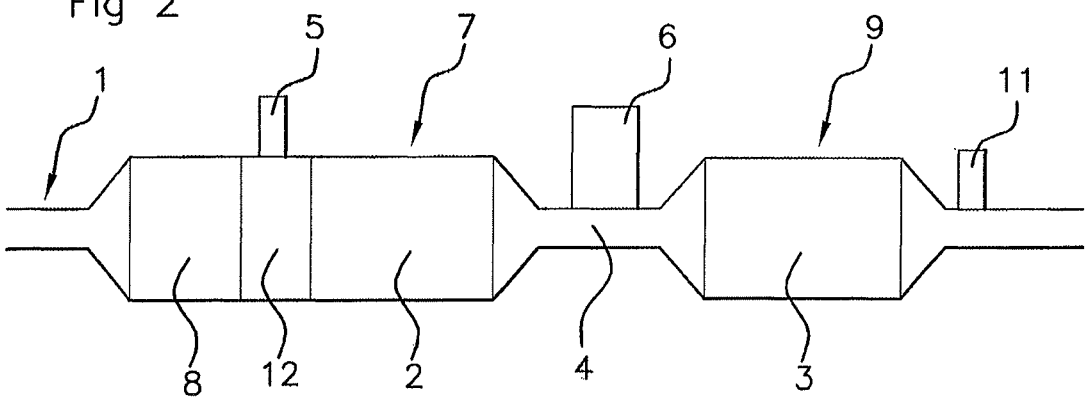
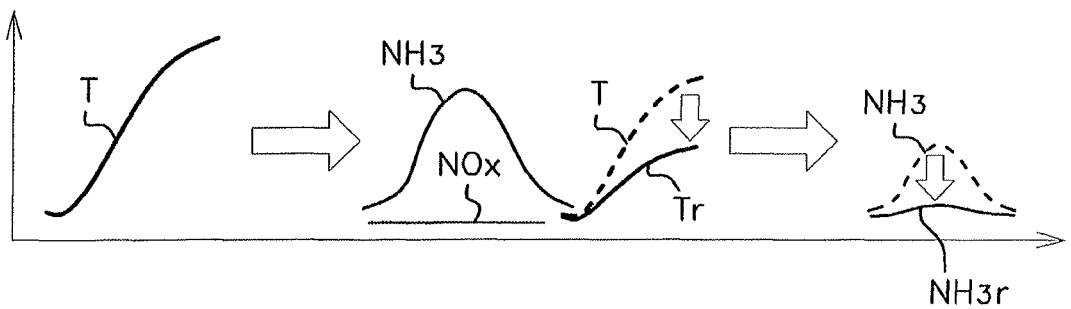

METHOD FOR OPTIMIZING THE CONSUMPTION OF REDUCING AGENT IN A MOTOR VEHICLE EXHAUST LINE

CROSS REFERENCE TO RELATED APPLICATIONS

This application is the U.S. National Phase Application of PCT International Application No. PCT/FR2017/050477, filed Mar. 3, 2017, which claims priority to French Patent Application 1651949, filed Mar. 9, 2016, the contents of such applications being incorporated by reference herein.

FIELD OF THE INVENTION

The present invention relates to a process for optimizing the consumption of reducing agent in an exhaust line for gases resulting from the combustion of a motor vehicle combustion engine. The present invention also relates to an outlet exhaust line of a motor vehicle internal combustion engine for carrying out such a process.

BACKGROUND OF THE INVENTION

Within the context of the invention, the outlet exhaust line of a motor vehicle internal combustion engine comprises several elements for selective depollution of a pollutant, including first and second selective catalytic reduction systems. The second system is arranged downstream of the first system in the exhaust line, being separated by a spacing in relation to the first system. The first reduction system has an injector upstream of a reduction catalyst which injects an ammonia precursor reducing agent into the exhaust line for the reduction of nitrogen oxides. This may also be the case for the second reduction system.

Such a system is known as a selective catalytic reduction system, also known under the abbreviation SCR. An SCR system operates by injection, into the exhaust line, of a depollution agent referred to as SCR reducer, this agent advantageously but nonlimitingly being urea or a urea derivative, an ammonia precursor which is used to reduce nitrogen oxides or $NO_x$.

In the following description, reference will be made either to the full name or the abbreviation SCR to denote everything associated with selective catalytic reduction. The same will apply to nitrogen oxides, which may be denoted by $NO_x$, and to ammonia which may be denoted by $NH_3$.

Such an SCR system may be integrated into a particle filter, as an alternative to an independent SCR system or as a supplement thereto. The particle filter is then impregnated with a catalyst to carry out selective catalytic reduction of NOR. When there are two SCR systems in the line, this applies equally to the first SCR system and to the second system.

As indicated above, the ammonia precursor reducing agent based on urea, the most commonly used of which is known under the name AdBlue®, reacts at high temperature to become ammonia or $NH_3$, the $NH_3$ reacting with nitrogen oxides or $NO_x$, mainly in the form of a mixture of nitrogen monoxide, or NO, and of nitrogen dioxide, or $NO_2$, in a ratio that varies especially depending on the engine operating conditions and on the temperature in the exhaust line. The depollution treatment of another pollutant or the maintenance of another depollution element, for example regeneration of a particle filter, may also influence the $NO/NO_2$ ratio.

The decomposition of urea to give $NH_3$ occurs according to the following equation:

$$CO(NH_2)_2 + H_2O \rightarrow 2NH_3 + CO_2$$

This applies for mixtures based on urea as ammonia precursor reducing agent.

For the reduction of $NO_x$, $NH_3$ reacts in turn with the nitrogen oxides to form, by a reduction reaction, diatomic nitrogen and water. For example, with nitrogen monoxide, the reaction is written:

$$4NO + 4NH_3 + O_2 \rightarrow 4N_2 + 6H_2O$$

Another reaction with nitrogen monoxide and nitrogen dioxide is written:

$$2NO + 4NH_3 + 2O_2 \rightarrow 4N_2 + 6H_2O$$

Other chemical reactions between $NO_x$ and $NH_3$ are also possible.

For an exhaust line comprising first and second selective catalytic reduction systems arranged one after the other, the ammonia not used by the first SCR system for reducing $NO_x$ may arrive at the second SCR system. This may especially occur during a temperature increase in the exhaust line, for which ammonia is desorbed. Such a temperature increase in the exhaust line may occur during strong accelerations of the vehicle or during steady running at high engine speeds.

It is possible that the release of ammonia is greater than required to enable the reduction of $NO_x$ by the second SCR system. In this case, a surplus, referred to as a leak, of $NH_3$ remains which is discharged into the environment upon leaving the exhaust line, when the temperature increase affects the second system. Since an emission of $NH_3$ is a toxic emission, it is suitable to neutralize, or prevent the creation of, such an $NH_3$ leak.

For this purpose, what is referred to as an active solution has thus been proposed, which provides control of $NH_3$ storage at sufficiently low levels as a function of temperature.

This active $NH_3$ storage control solution is based on a compromise between the depollution of $NO_x$ and the reduction of $NH_3$ leaks, which entails increasing the emission of $NO_x$, with optimal depollution of $NO_x$ therefore no longer being provided. Moreover, this solution is very complex and not particularly robust in command terms, especially when it is managed by an engine control unit.

There will therefore be an increase in the emission of $NO_x$ during accelerations of the vehicle when the $NH_3$ storage control is too strict or the $NH_3$ storage setpoint is too low. Conversely, there may still be an $NH_3$ leak, that is to say a leak of $NH_3$ not used for reduction, if the $NH_3$ storage control is not quick enough or the $NH_3$ setpoint is too high, relative to the increase in temperature, and the time required to consume the $NH_3$ in the SCR catalyst of the second system.

Document US 2011/023463A1, incorporated by reference herein, is known, which relates to processes and systems for controlling a vehicle system having a first SCR region upstream of a second SCR region for emission control. In one example, when the temperature in the line at the second SCR region exceeds a maximum given temperature value, forced cooling is carried out of the second SCR region, which may be coupled to a cooling device to maintain a lower temperature than the first SCR region.

Other solutions, referred to as passive solutions, have also been proposed. One passive solution proposes an increase in the volume of the SCR catalysts. Another passive solution proposes using a catalyst for cleaning up waste ammonia, also referred to as "clean up catalyst" or "ammonia slip catalyst", to remove the surplus $NH_3$ not used for the selective catalytic reduction of the two consecutive SCR systems in the exhaust line. The clean up catalyst for the ammonia waste is located downstream of the two SCR systems in the exhaust line, advantageously in the downstream end portion of the exhaust line.

These solutions have the drawback of increasing the cost and bulk of the system by increasing the volume of the SCR catalyst, for the first passive solution, and by creating an additional catalyst, for the second solution.

Document US-A-2011/011060, incorporated by reference herein, describes an exhaust line having an SCR system and an active nitrogen oxide trap. During regenerations of the nitrogen oxide trap, which regenerations occur at regular intervals of time for emptying the trap of the $NO_x$ that it has adsorbed, since the emptying occurs under conditions of greater richness and therefore with a surplus of hydrocarbons, the trap releases ammonia. This ammonia is captured by the SCR system then used later for the catalytic reduction of $NO_x$. This document proposes creating a Venturi effect between the $NO_x$ trap and the SCR system, which supplies sufficient air to keep the SCR system under poor richness or richness below 1.

Keeping the richness below 1 such as this makes it possible to protect the SCR catalyst from poisoning by hydrocarbons during regenerations and reduces losses of $NH_3$ by oxidation. However, such a document does not discuss the problem of the association of two SCR systems placed one after the other in the exhaust line and gives no indication as to a reduction of leaks of $NH_3$ that has not been used for reducing $NO_x$ and is therefore lost.

SUMMARY OF THE INVENTION

The problem underlying the present invention is, for a motor vehicle exhaust line fitted with two selective catalytic reduction systems for the reduction of nitrogen oxides, that of optimizing the consumption of reducing agent in order to reduce the surplus ammonia in the exhaust line that has not been used for the reduction.

To this end, an aspect of the present invention relates to a process for optimizing the consumption of reducing agent in the form of ammonia in an exhaust line for gases resulting from the combustion in a motor vehicle combustion engine, the exhaust line comprising first and second selective catalytic reduction systems, the second reduction system being arranged downstream of the first reduction system in the exhaust line, being separated by a spacing relative to the first reduction system, the first reduction system injecting an ammonia precursor agent into the exhaust line for the reduction of nitrogen oxides, a surplus of unused ammonia passing via the exhaust line from the first to the second reduction system, characterized in that the temperature in the exhaust line at the second reduction system is measured or estimated at predetermined time intervals, and when a rate of temperature rise, calculated from temperature measurements or estimations, is greater than a predetermined rate of temperature rise, with the proviso that the temperature in the line at the second reduction system is greater than a second maximum temperature value that is less than a first maximum temperature value, forced cooling is carried out in the spacing between the first and second reduction systems.

The solution consists in lowering the temperature as quickly as possible then in controlling it so that the amount of $NH_3$ is just enough for the reduction of $NO_x$ in the exhaust gases. This is achieved by introducing rapid cooling between the two SCR systems spaced apart from one another. Indeed, as will be seen below, it is possible to suspend the cooling under certain conditions, for example when the temperature drops significantly or when the temperature is not very high.

This cooling device may be activated when the temperature in the exhaust line increases greatly during accelerations and during steady running at high temperature. Thus, the cooling may be carried out over a longer period than over an acceleration.

The cooling may occur as soon as a predetermined maximum temperature value or first value has been reached or will probably be reached. In the latter case, the rate of temperature rise is taken into account, as soon as the temperature has reached a temperature value or second value that is less than the predetermined maximum temperature. Controlling the process depending on obtaining a relatively high rate of rise makes it possible to anticipate reaching the first value in a shorter time interval.

Carrying out such a process enables a reduction of leaks of $NH_3$ that has not been used for the reduction. The effectiveness of the second SCR system is optimized by carrying out the process, by controlling $NH_3$ leaks. An increase in the storage of $NH_3$ in the second SCR system is thus possible, and hence a saving in reducing agent and also a reduction in resultant external pollution by $NH_3$, all without increasing $NO_x$ emissions and therefore without detrimentally affecting $NO_x$ depollution. $NO_x$ emissions may even decrease.

Compared to the prior art, there is no need to increase the volume of the catalyst of the second SCR system. Moreover, it is not compulsory to use a clean up catalyst for the $NH_3$ at the exhaust line outlet, i.e. downstream of the second SCR system.

Advantageously, the forced cooling is suspended in the case in which the second system has not reached a predetermined normal operating temperature, this predetermined normal operating temperature being less than 180° C. This enables the optimal operation of the second SCR system, the priority being given to the rise in working temperature of the second SCR system.

Advantageously, the forced cooling is programmed to last from 20 to 40 seconds, causing a drop in temperature of 50° to 100° C. in the spacing between the two reduction systems. This corresponds to the duration of a strong but short acceleration of a motor vehicle.

Advantageously, the forced cooling is programmed to last several minutes or continuously, causing a drop in temperature of 50° to 100° C. or more in the spacing between the two reduction systems. This corresponds to sustained acceleration or to steady running at high temperature of the motor vehicle.

Exceeding the predetermined rate of temperature rise corresponds to rapidly obtaining a high temperature at the second RCS system, signifying a leak of $NH_3$ not used for the reduction of $NO_x$ if the second system already has $NH_3$ stored or if a surplus from the first system is released and stored in the second. The time intervals are relatively short in order to ensure highly reactive cooling in the exhaust line at the second SCR system.

It is desirable to deactivate the cooling device as a function of the running conditions in the exhaust. It is even desirable to control the level of cooling as a function of the running conditions.

Advantageously, the first maximum temperature value is approximately 340° C. and the second maximum temperature value is approximately 310° C.

Advantageously, the predetermined rate of temperature rise is approximately 0.2° C. per second and the time interval between two measurements or estimations is approximately 0.5 to 1 second.

In an optional embodiment, during a forced cooling, when the rate of rise becomes less than the predetermined rate of temperature rise, if the temperature measurement or estimation in the line at the second system indicates a temperature greater than the second maximum temperature value, the forced cooling continues and if this measurement or estimation indicates a temperature less than the second maximum temperature value, the cooling is suspended.

Thus, if the temperature does not increase any further but remains at a high level which according to experience represents a surplus of $NH_3$ not consumed for the reduction of $NO_x$ and forming an $NH_3$ leak, cooling is carried out, which is not the case if the temperature is below the maximum predetermined temperature representative of the formation of a surplus of $NH_3$. In the latter case, the cooling may be suspended in order to return to normal conditions of consumption of reducing agent.

An aspect of the present invention also relates to an outlet exhaust line of a motor vehicle internal combustion engine, the line comprising several elements for selective depollution of a pollutant, including first and second selective catalytic reduction systems, the second reduction system being arranged downstream of the first reduction system in the exhaust line, being separated by a spacing relative to the first reduction system, the first reduction system comprising an injector for injecting an ammonia precursor agent into the exhaust line for the reduction of nitrogen oxides, characterized in that it comprises means for carrying out such a process for optimizing the consumption of reducing agent in the form of ammonia in the line, the spacing comprising a forced cooling device.

Advantageously, the forced cooling device is of the power recovery turbine type, also known as "turbo compound", at least partially housed in the exhaust line, or of the Rankine cycle energy recovery type, or a technical equivalent. The forced cooling device may recover energy which may be stored, which is another preferential advantage of an aspect of the present invention.

Advantageously, the first catalytic reduction system is grouped together in a first depollution block with a particle filter and an oxidation catalyst, the first reduction system being integrated in the particle filter, an injector for injecting an ammonia precursor reducing agent passing through a wall of the first block and opening into the first block upstream of the first reduction system, the second reduction system being integrated into the first block after the first reduction system, leaving a spacing between them, or being integrated into a second block with a spacing between first and second blocks, the exhaust line comprising one or more elements selected from at least one low- and/or high-pressure engine air intake exhaust gas recirculation line, a passive or active nitrogen oxide trap, a temperature sensor or a nitrogen oxide sensor.

An aspect of the present invention relates to an assembly of such an exhaust line and of the depollution command and control unit thereof, characterized in that the exhaust line is as described above, the command and control unit comprising elements for estimating or measuring the temperature in the spacing between the two systems, means for calculating a rate of temperature rise, means for comparing a calculated rate of rise with a predetermined rate of temperature rise stored in memory by memory storage means of the command and control unit or means for storing in memory a first and a second maximum temperature value with means for comparing the measured or estimated temperature with the two maximum temperature values stored in memory and means for activating or deactivating the cooling device.

Thus, extended control is carried out of the amount of $NH_3$ remaining as surplus after reduction of $NO_x$ in the second system and forming an $NH_3$ leak, this control being adapted as closely as possible to the operation of the motor vehicle combustion engine, especially by monitoring the temperature in the exhaust line.

BRIEF DESCRIPTION OF THE DRAWINGS

The aims, subjects, features and advantages of aspects of the invention will be more clearly apparent from the detailed description of an embodiment of the invention, which is illustrated by the following accompanying drawings, in which:

FIG. 1 is a schematic representation of a side view of a portion of an exhaust line comprising depollution elements including two consecutive SCR systems, the exhaust line being in accordance with the prior art, FIG. 1A shows curves of temperature and respective concentrations of $NO_x$ and $NH_3$ at various locations in the exhaust line illustrated in FIG. 1, FIG. 2 is a schematic representation of a side view of a portion of an exhaust line comprising depollution elements including two consecutive SCR systems separated in two different depollution blocks, the exhaust line being in accordance with a first embodiment of an aspect of the present invention and comprising a forced cooling device inserted between the SCR systems, FIG. 2A shows curves of temperature and respective concentrations of $NO_x$ and $NH_3$ at various locations in the exhaust line illustrated in FIG. 2, the temperature of the line decreasing at the second SCR system due to the forced cooling device inserted between the two SCR systems and the concentration of the $NH_3$ leak at the end of the exhaust line after the second SCR system being very low or zero.

DETAILED DESCRIPTION OF THE PREFERRED EMBODIMENTS

Figure 3:
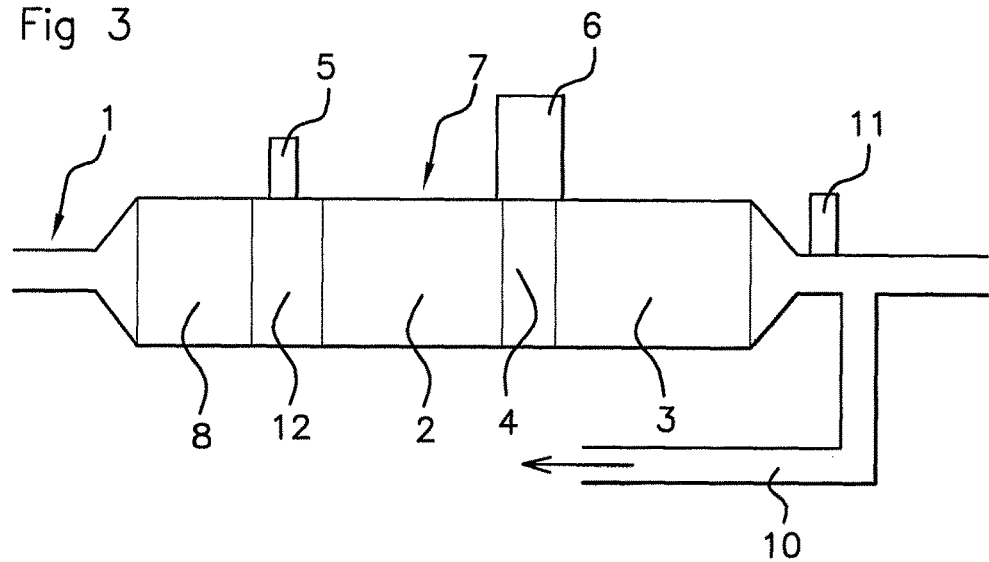
FIG. 3 is a schematic representation of a side view of a portion of an exhaust line comprising depollution elements including two consecutive SCR systems contained separated in the same depollution block with a forced cooling device inserted between the SCR systems, an EGR line being illustrated in this figure after the depollution block, the exhaust line being in accordance with a second embodiment of an aspect of the present invention, FIGS. 4 and 5 again show the exhaust line according to FIG. 2 in accordance with the first embodiment of the invention, adding an EGR line thereto at a respective location.

In FIGS. 1, 2 and 3 to 5, only a part of the exhaust line bearing the depollution elements is shown. A full exhaust line may contain a turbine of a turbocharger and/or a high-pressure engine intake exhaust gas recirculation line, this high pressure recirculation line being branched off the exhaust line upstream of the turbine. Such recirculation lines are subsumed under the abbreviation EGR line, which abbreviation will be used hereinafter equivalently to recirculation line.

The exhaust line according to an aspect of the present invention should be taken in the broad sense as an exhaust system and not as a simple exhaust pipe. The exhaust line therefore comprises elements which are external to the exhaust pipe, such as an exhaust gas recirculation line at the intake of the engine, although this is connected and takes off exhaust gases directly from this pipe.

The terms upstream and downstream are to be used in relation to the engine to which the exhaust line is connected. The inlet of the exhaust line connected to the outlet of the engine is the portion of the line the furthest upstream and the outlet of the exhaust line towards the outside is the portion of the exhaust line the furthest downstream.

FIG. 1 represents a portion of an exhaust line 1' according to the prior art. This exhaust line 1' has features in common with an exhaust line 1 according to an aspect of the present invention.

An outlet exhaust line 1, 1' of a motor vehicle internal combustion engine, equally according to the prior art shown in FIG. 1 and according to embodiments of the present invention shown in FIGS. 2 and 3 to 5, comprises several elements for the selective depollution of a pollutant.

For example, in FIGS. 1, 2, and 3 to 5, an oxidation catalyst 8, a particle filter and first and second selective catalytic reduction systems, or SCR, 2, 3, are shown. This is nonlimiting and only the first and second SCR selective systems 2, 3, are essential for an aspect of the present invention.

For example, the first system 2 or the second system 3 may be integrated in a particle filter in an exhaust line 1 in accordance with an aspect of the present invention. The exhaust line 1 may optionally comprise one or more $NO_x$ traps associated, or not associated, with an oxidation catalyst 8 and/or a catalyst for ammonia waste which may for example be integrated into the second SCR system, although numerous scenarios of an aspect of the present invention make it possible to do away with same.

The second SCR system 3 is arranged downstream of the first SCR system 2 in the exhaust line 1', 1 being spaced apart by a spacing 4 from the first SCR system 2.

Conventionally, the first SCR system 2 injects an ammonia precursor agent into the exhaust line 1', 1 for the reduction of nitrogen oxides. Although it is not shown in the figures that the second SCR system 3 also has a device for injecting precursor agent placed upstream of the second SCR system 3, such an arrangement falls within the context of an aspect of the present invention.

$NH_3$ not consumed by the first SCR system 2 for the reduction of $NO_x$ and desorbed may be conveyed with the exhaust gases to the second SCR system 3.

As can be seen in FIG. 1A, with the exhaust line 1' of the prior art, when the temperature increases in a first block 7 integrating the first SCR system 2, $NH_3$ is produced from the injected urea-based precursor agent. A part of the amount of $NH_3$ produced is used for the reduction of the $NO_x$, with the result that the concentration of the $NO_x$ remains substantially zero.

With a temperature increase between the two SCR systems 2, 3, if this temperature increase is sufficiently great, $NH_3$ adsorbed in the second SCR system 3 is desorbed. However, this amount of $NH_3$ is not used for the reduction of $NO_x$ and represents a surplus, or leak of ammonia of $NH_3$ which is discharged into the environment; this should be avoided, since ammonia is a toxic product.

It can be seen in FIG. 1A that, at the downstream end of the second SCR system 3 in the exhaust line 1', there remains a surplus of $NH_3$ not used for the reduction, forming an $NH_3$ leak. This surplus of $NH_3$ is reflected by a peak in a reduced time interval, the surplus of unused $NH_3$ decreasing relatively rapidly since it is used in treating a surplus of $NO_x$ in the exhaust line 1', this being a consequence of acceleration or maintaining at a steady high engine speed.

In FIG. 1A, the reference T indicates the temperature, $NO_x$ indicates the concentration of nitrogen oxides and $NH_3$ indicates the concentration of ammonia. There is a curve for the $NH_3$ concentration upstream of the second SCR system 3 and a curve for the $NH_3$ concentration downstream of this second SCR system 3. This will also apply for FIG. 2, showing the application of the optimization process according to an aspect of the present invention.

With reference to FIGS. 2, 2A and 3 to 5, in order mainly to avoid the formation of a surplus or leak of $NH_3$ at the outlet of the exhaust line 1, an aspect of the present invention relates to a process for optimizing the consumption of reducing agent in the form of ammonia in an exhaust line 1 as described above with two SCR systems 2, 3 spaced apart from one another in the line 1 by a spacing 4.

In this process, the temperature in the exhaust line 1 at the second SCR system 3 is measured or estimated. From measurements or estimations of temperature in the exhaust line 1 at the second SCR system 3, taken at predetermined time intervals, a rate of temperature rise is calculated. When this rate of rise is greater than a predetermined rate of temperature rise, forced cooling is carried out in the spacing 4 between first and second SCR systems 2, 3.

As an alternative, the forced cooling may also be carried out when the temperature in the line at the second reduction system exceeds a first maximum temperature value.

In the context of an aspect of the invention, it is suitable to monitor the increase in temperature in order to anticipate reaching a high temperature with formation of too large an amount of $NH_3$ to be just enough to ensure the reduction of $NO_x$. This is done by monitoring the rate of temperature rise at the second SCR system 3.

As long as this rate of rise continues, the process is activated. Since even rapid cooling does not have instantaneous action, it is suitable to act as early as possible during a rise in the rate of temperature increase, even if this means interrupting carrying out the process if a maximum temperature is not reached or if the rate of temperature increase decreases greatly.

The first maximum temperature value is approximately 340° C. and the second maximum temperature value is approximately 310° C. The temperature may be measured at a location of the exhaust line 1 other than at the second SCR system 3 and extrapolated at this point.

The forced cooling occurs without addition of a gas or a liquid into the exhaust line 1, without changing the flow rate in the line or the concentration of oxygen or hydrocarbons in this exhaust line 1. This makes it possible to not disrupt the flow rate of gas in the line 1. Moreover, such an addition of gas or of liquid would not be sufficient to guarantee effective cooling of the line at the second SCR system 3. And yet, forced and pronounced cooling is sought in the context of an aspect of the present invention.

An aspect of the present invention also relates to an exhaust line 1 using the features mentioned above, essentially first and second SCR systems 2, 3. The second SCR system 3 is arranged downstream of the first SCR system 2 in the exhaust line 1 and is spaced apart by a spacing 4 from the first SCR system 2. The spacing 4 comprises a forced cooling device 6 in the exhaust line 1.

In FIGS. 2 and 3 to 5, the cooling device 6 is represented symbolically by a rectangle outside the exhaust line 1. It should however be borne in mind that the cooling device 6 may be at least partially integrated into the exhaust line 1.

As can be seen in FIG. 2A, the temperature without cooling and the surplus of $NH_3$ also without cooling, respectively at the inlet and at the outlet of the second SCR system 3, are shown as dashed lines, respectively with the references T and $NH_3$, while the cooled temperature Tr and the surplus or leak of $NH_3$ after cooling $NH_3$r are shown as solid lines, the cooling being carried out in accordance with an aspect of the present invention.

The cooling changes the direction of the temperature rise and therefore the formation of $NH_3$, according to the vertical arrow pointing downwards. This leads to a reduction in the amount of $NH_3$ formed, which is only used for the reduction of $NO_x$. As a consequence, the surplus or leak of $NH_3$ not used for the reduction and discharged to the environment outside the exhaust line 1 is significantly decreased or even is zero compared to that of the prior art shown in FIG. 1A.

In a first scenario, the forced cooling may be programmed to last from 20 to 40 seconds, causing a drop in temperature of 50 to 100° C. in the spacing 4 between the two reduction systems 2, 3.

In a second scenario, the forced cooling may be programmed to last several minutes, or continuously, causing a drop in temperature of 50 to 100° C. or more in the spacing between the two reduction systems 2, 3. This corresponds to sustained acceleration or steady running at high temperature of the motor vehicle.

The predetermined rate of temperature rise may be approximately 0.2° C. per second and the time interval between two measurements or estimations may be approximately 0.5 to 1 second.

During a forced cooling, when the rate of rise becomes less than the predetermined rate of temperature rise, if the temperature measurement or estimation in the line at the second system 3 indicates a temperature greater than the second maximum temperature value, the forced cooling continues and if this measurement or estimation indicates a temperature less than the second maximum temperature value, the cooling is suspended.

This is not incompatible with a forced cooling programmed to last from 20 to 40 seconds, given that the maximum temperature is predetermined to be representative of an acceleration or of steady running producing a surplus or leak of $NH_3$ not used for the reduction of $NO_x$, since an acceleration may last this long.

Several types of cooling devices 6 may be used in the context of an aspect of the present invention. For example, but nonlimitingly, the forced cooling device 6 is of the power recovery turbine type or of the Rankine cycle energy recovery type, or a technical equivalent, at least partially housed in the exhaust line 1.

In a preferential application of an aspect of the invention, the forced cooling device 6 may recover energy which may be stored. For example, the cooling device 6 may produce electricity and be connected to an electrical generator which stores this electricity as a source of backup energy. This may for example serve for recharging the battery or batteries of the motor vehicle.

With reference more particularly to FIGS. 2 and 3 to 5, the first SCR system 2 may be grouped together in a first depollution block 7 with a particle filter and an oxidation catalyst 8. In this case, the first SCR system 2 may be integrated into the particle filter. An injector 5 for injecting an ammonia precursor reducing agent may pass through a wall of the first block 7 and open into the first block 7 upstream of the first SCR system 2.

Figure 4:
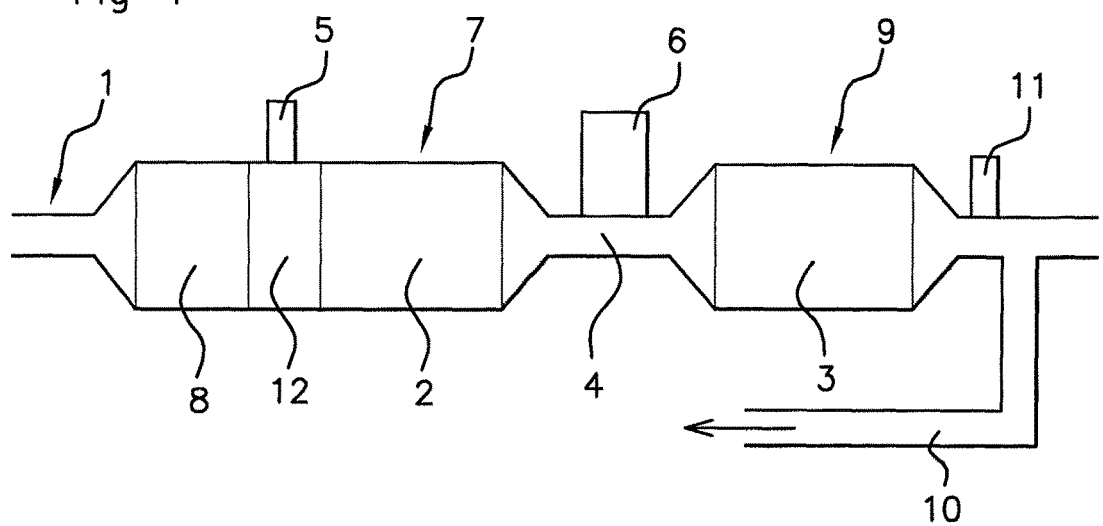
Figure 5:
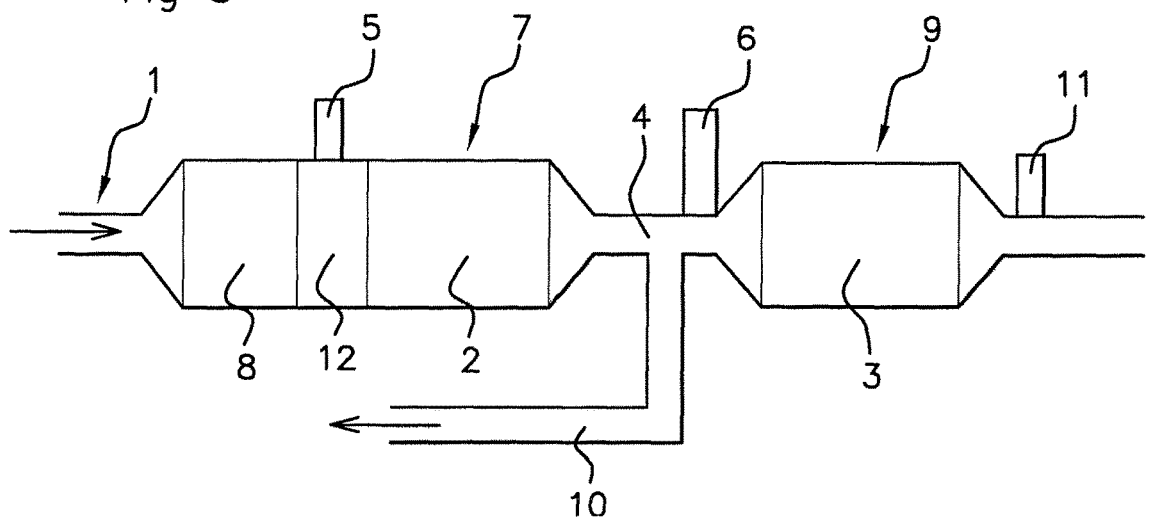

In FIG. 3, the second SCR system 3 may be integrated into the first block 7 after the first SCR system 2, leaving a spacing 4 between them. In FIGS. 2, 4 and 5, the second SCR system 3 may be integrated into a second block 9 with a spacing 4 between first and second blocks 7, 9. The cooling device 6 is active in this spacing 4.

The exhaust line 1 may comprise one or more elements selected from at least one low and/or high pressure EGR line 10, a passive or active nitrogen oxide trap, a temperature sensor, a nitrogen oxide sensor 11, an oxygen sensor, a soot capturing device for the particle filter, this list not being exhaustive or compulsory. It is also possible to include an ammonia clean up catalyst at the outlet of the exhaust line 1, although the exhaust line 1 according to an aspect of the present invention makes it possible to do away with such a catalyst in a broad engine operating range.

In FIG. 3, a low-pressure EGR line 10 branches off downstream from the sole first block 7 close to the outlet of the first block 7. The nitrogen oxide sensor 11 is also present in the exhaust line 1, being inserted between the first block 7 and the EGR line 10.

In FIG. 4, a low-pressure EGR line 10 branches off downstream from the second block 9 close to the outlet of the second block 9. The nitrogen oxide sensor 11 is also present in the exhaust line 1, being inserted between the second block 9 and the EGR line 10.

In FIG. 5, a low-pressure EGR line 10 branches off between the first and second blocks 9 in the spacing 4. This may advantageously occur upstream or downstream of the cooling device 6. Upstream branching off of the cooling device 6 is shown in FIG. 5. The nitrogen oxide sensor 11 is also present in the exhaust line 1, being placed downstream of the second block 9.

In FIGS. 3 to 5, an arrow in the EGR line 10 indicates the path of the recirculated gases towards the engine intake. In FIG. 5, an arrow in the exhaust line 1 indicates the path of the exhaust gases in the line 1. This also applies for FIGS. 2, 3 and 4.

For each FIGS. 2 and 3 to 5, after the injector 5, the first block 7 has a chamber 12 for mixing ammonia precursor reducing agent with the exhaust gases, advantageously AdBlue®. This precursor agent may decompose to give an agent able to provide selective catalytic reduction, that is to say to give $NH_3$, and be mixed with the exhaust gases in the mixing chamber 12.

Regarding a passive or active $NO_x$ trap, an LNT (Lean $NO_x$ Trap) system may be used. Such a trap system eliminates $NO_x$ via a brief passage into richness of one or more in the gases output from the engine. The surplus hydrocarbons react with the stored $NO_x$ and neutralize them by converting them into nitrogen gas. This system is said to be active because there is a modification by the engine control unit.

Another system in the form of a PNA (Passive $NO_x$ Adsorber) trap may also be used. This system is said to be passive because there is no passage into richness of one or more for $NO_x$ purification.

An active nitrogen oxide trap makes it possible to retain $NO_x$ under engine operating conditions that are not favorable for depollution, this active nitrogen oxide trap being able to release and/or destroy trapped $NO_x$ under other conditions more favorable for their destruction.

Such a $NO_x$ trap as $NO_x$ adsorber may be used in combination with an SCR system. This makes it possible to increase the effectiveness of elimination of nitrogen oxides by adsorption of the nitrogen oxides at low temperature and desorption of the oxides once the catalyst of the SCR system is active. The SCR system is frequently placed downstream of the $NO_x$ trap, whether this is active or passive.

An aspect of the present invention also relates to an assembly of such an exhaust line 1 and of the depollution command and control unit thereof, the exhaust line 1 being as described above. The command and control unit comprises elements for estimating or measuring the temperature in the spacing 4 between the two SCR systems 2, 3, and means for calculating a rate of temperature rise.

The command and control unit comprises means for comparing a calculated rate of rise with a predetermined rate of temperature rise stored in memory by memory storage means of the command and control unit. Finally, according to the calculated rate of rise, the command and control unit comprises means for activating and for deactivating the cooling device 6.

As an alternative, the command and control unit comprises means for storing in memory a first and a second maximum temperature value with means for comparing the measured or estimated temperature with the two maximum temperature values stored in memory and means for activating or deactivating the cooling device 6.

The deactivating means are operational under the above-mentioned conditions, namely a second SCR system 3 that has not reached its optimal operating temperature, an inversion in the rate of temperature rise leading to a decrease in the temperature, or alternatively a measured or estimated temperature that is less than a maximum predetermined temperature and recognized as involving the formation of a surplus of $NH_3$ not consumed for the reduction of $NO_x$ and forming an $NH_3$ leak.

The process and the exhaust line according to aspects of the present invention make it possible to reduce toxic emissions of $NH_3$ into the environment. There is less oxidation of $NH_3$, from approximately 400° C., and less formation of NO, from 500° C., if an $NH_3$ oxidation catalyst is present.

The invention claimed is:

1. A process for optimizing consumption of a reducing agent in the form of ammonia in an exhaust line for gases resulting from the combustion of a motor vehicle combustion engine, the exhaust line comprising first and second selective catalytic reduction systems, the second reduction system being arranged downstream of the first reduction system in the exhaust line, being spaced apart by a spacing from the first reduction system, the first reduction system injecting an ammonia precursor agent into the exhaust line for the reduction of nitrogen oxides, a surplus of unused ammonia passing via the exhaust line from the first to the second reduction system, comprising measuring or estimating the temperature in the exhaust line at the second reduction system at predetermined time intervals, and:
when a rate of temperature rise, calculated from the measured or estimated temperature in the exhaust line, is greater than a predetermined rate of temperature rise, with the proviso that the temperature in the line at the second reduction system is greater than a second maximum temperature value that is less than a first maximum temperature value,
carrying out forced cooling in the spacing between the first and second reduction systems.

2. The process as claimed in claim 1, wherein the forced cooling is suspended in a case in which the second system has not reached a predetermined normal operating temperature.

3. The process as claimed in claim 1, wherein the forced cooling is programmed to last from 20 to 40 seconds, causing a drop in temperature of 50 to 100° C. in the spacing between the two reduction systems.

4. The process as claimed in claim 1, wherein the first maximum temperature value is 340° C. and the second maximum temperature value is 310° C.

5. The process as claimed in claim 1, wherein the predetermined rate of temperature rise is 0.2° C. per second and the time interval between two measurements or estimations is 0.5 to 1 second.

6. The process as claimed in claim 1, wherein, during the forced cooling, when the rate of rise becomes less than the predetermined rate of temperature rise, if the temperature measurement or estimation in the line at the second system indicates a temperature greater than the second maximum temperature value, the forced cooling continues and if this measurement or estimation indicates a temperature less than the second maximum temperature value, the cooling is suspended.

7. An outlet exhaust line of a motor vehicle internal combustion engine, the line comprising:
first and second selective catalytic reduction systems configured for selective depollution of a pollutant, the second reduction system being arranged downstream of the first reduction system in the exhaust line, being spaced apart by a spacing from the first reduction system, the first reduction system comprising an injector for injecting an ammonia precursor agent into the exhaust line for the reduction of nitrogen oxides; and
a depollution command and control unit configured to perform a process for optimizing the consumption of reducing agent in the form of ammonia in the line as claimed in claim 1,
wherein the spacing comprises a forced cooling device.

8. The exhaust line as claimed in claim 7, wherein the forced cooling device is a power recovery turbine type or a Rankine cycle energy recovery type, or a technical equivalent, being at least partially housed in the exhaust line.

9. The exhaust line as claimed in claim 7, wherein the first reduction system is grouped together in a first depollution block with a particle filter and an oxidation catalyst, the first reduction system being integrated in the particle filter, an injector for injecting an ammonia precursor reducing agent passing through a wall of the first block and opening into the first block upstream of the first reduction system, the second reduction system being integrated into the first block after the first reduction system, leaving a spacing between them, or being integrated into a second block with a spacing between the first and second blocks, the exhaust line comprising one or more elements selected from at least one low and/or high-pressure engine air intake exhaust gas regeneration line, a passive or active nitrogen oxide trap, a temperature sensor or a nitrogen oxide sensor.

10. An assembly of an exhaust line and of the depollution command and control unit thereof, wherein the exhaust line is as claimed in claim 7, the command and control unit configured to:
estimate or measure the temperature in the spacing between the two reduction systems,
calculate a rate of temperature rise,
compare a calculated rate of rise with a predetermined rate of temperature rise stored in memory of the command and control unit or store in the memory a first and a second maximum temperature value and compare the measured or estimated temperature with the two maximum temperature values stored in the memory,
and activate or deactivate the cooling device.

11. The process as claimed in claim 1, wherein the forced cooling is suspended in the case in which the second system has not reached a predetermined operating temperature of less than 180° C.

12. The process as claimed in claim 2, wherein the forced cooling is programmed to last from 20 to 40 seconds, causing a drop in temperature of 50 to 100° C. in the spacing between the two reduction systems.

13. The exhaust line as claimed in claim 8, wherein the first reduction system is grouped together in a first depollution block with a particle filter and an oxidation catalyst, the first reduction system being integrated in the particle filter, an injector for injecting an ammonia precursor reducing agent passing through a wall of the first block and opening into the first block upstream of the first reduction system, the second reduction system being integrated into the first block after the first reduction system, leaving a spacing between them, or being integrated into a second block with a spacing between the first and second blocks, the exhaust line comprising one or more elements selected from at least one low and/or high-pressure engine air intake exhaust gas regeneration line, a passive or active nitrogen oxide trap, a temperature sensor or a nitrogen oxide sensor.

14. An assembly of such an exhaust line and of the depollution command and control unit thereof, wherein the exhaust line is as claimed in claim 8, the command and control unit configured to:

estimate or measure the temperature in the spacing between the two reduction systems, calculate a rate of temperature rise, compare a calculated rate of rise with a predetermined rate of temperature rise stored in memory of the command and control unit or store in the memory a first and a second maximum temperature value and compare the measured or estimated temperature with the two maximum temperature values stored in the memory, and activate or deactivate the cooling device.

15. An assembly of an exhaust line and of the depollution command and control unit thereof, wherein the exhaust line is as claimed in claim 9, the command and control unit configured to:

estimate or measure the temperature in the spacing between the two reduction systems, calculate a rate of temperature rise, compare a calculated rate of rise with a predetermined rate of temperature rise stored in memory of the command and control unit or store in the memory a first and a second maximum temperature value and compare the measured or estimated temperature with the two maximum temperature values stored in the memory, and activate or deactivate the cooling device.

* * * * *